Figure 1:
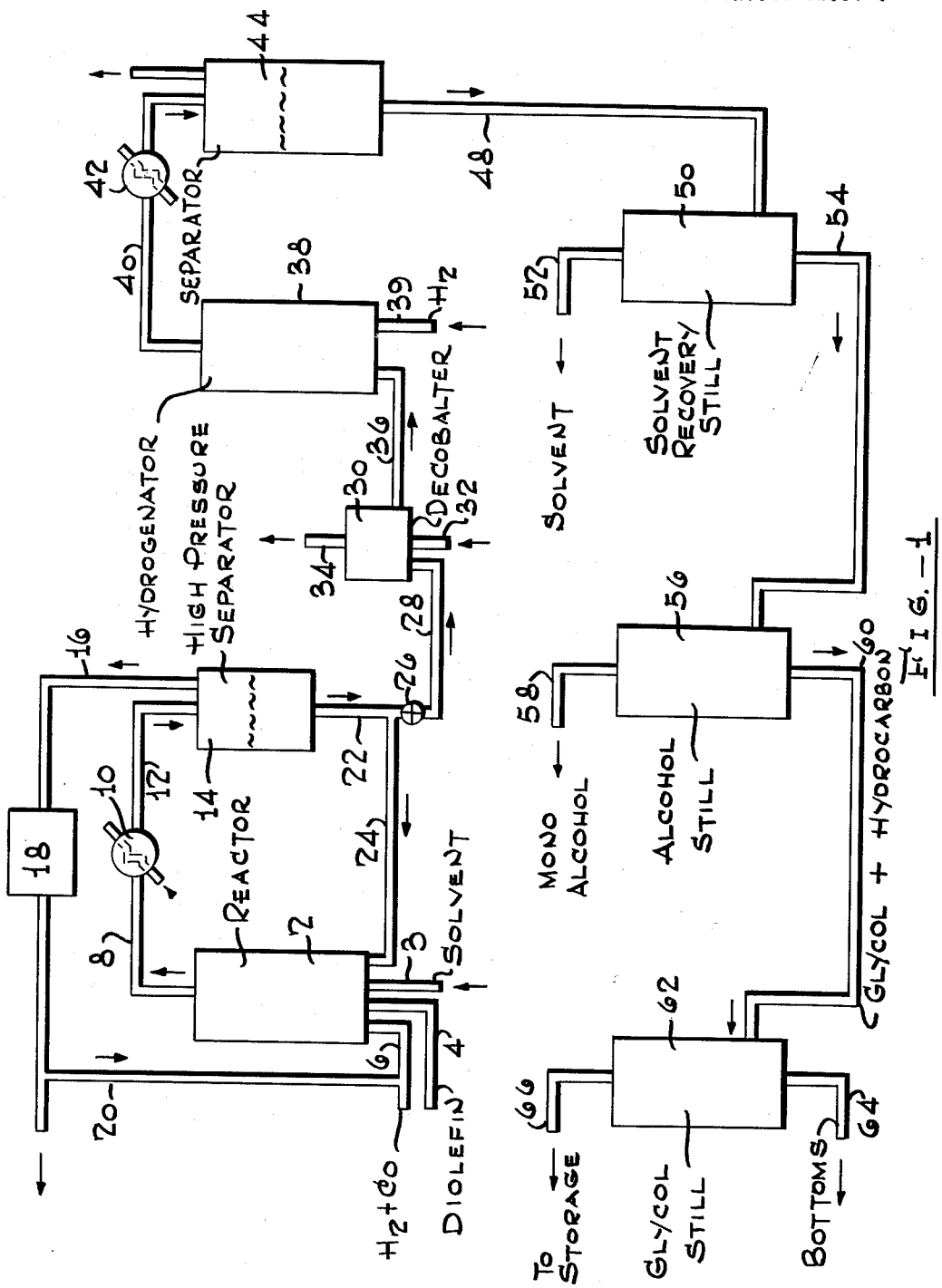
Figure 2:
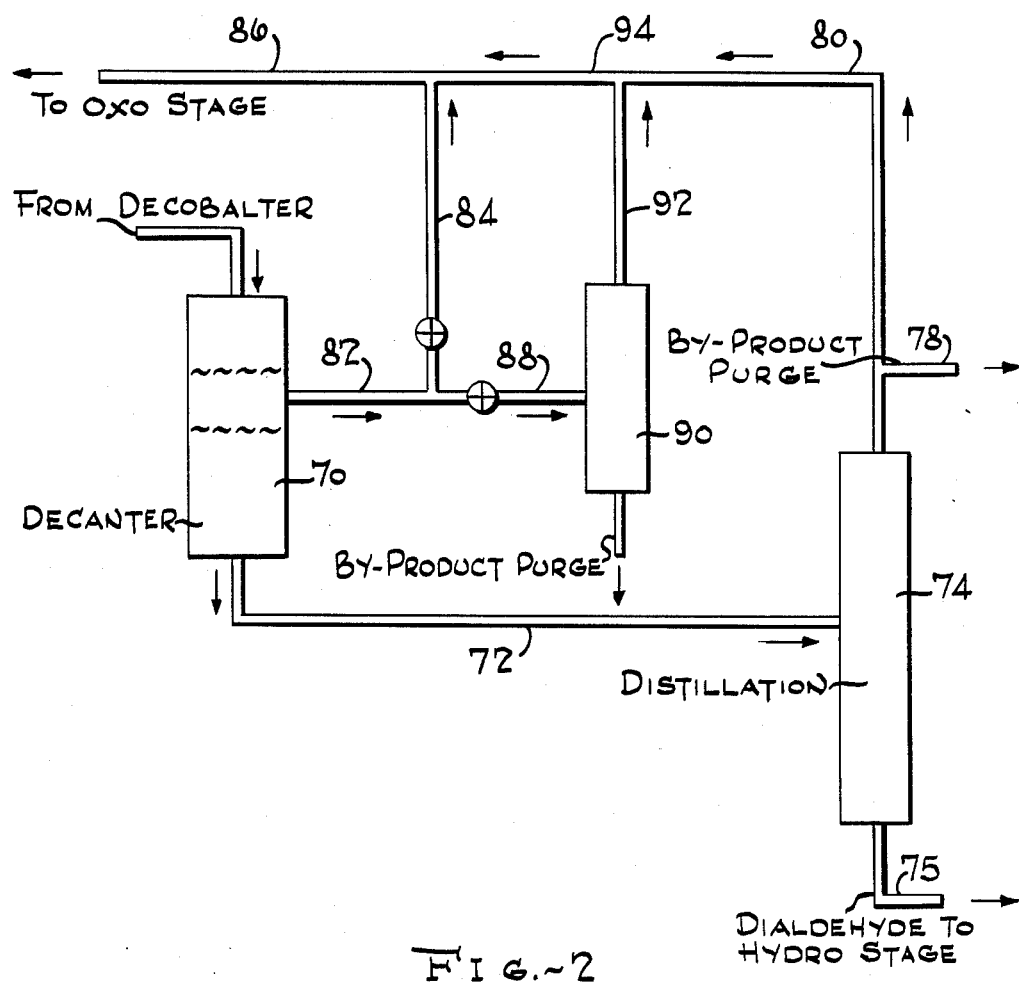

United States Patent Office 2,738,370
Patented Mar. 13, 1956

2,738,370

PREPARATION OF ALICYCLIC GLYCOLS

John H. Staib, Scotch Plains, and Joseph Stewart, Cranford, N. J., assignors to Esso Research and Engineering Company, a corporation of Delaware Application July 11, 1951, Serial No. 236,234

5 Claims. (Cl. 260—617)

The present invention relates to the preparation of oxygenated organic compounds by the reaction of carbon monoxide and hydrogen with olefinic hydrocarbons in the presence of a carbonylation catalyst. More specifically, the present invention relates to the preparation of bi-functional compounds from diolefins, which compounds have been found to have exceptional properties, particularly as intermediates in plasticizers and synthetic lubricating oils.

The carbonylation, or Oxo, reaction, though of only recent development, has proved itself to be a valuable tool in the synthesis of aldehydes and primary alcohols. By means of a reaction involving interaction of olefins and CO and $H_2$ at elevated temperatures and pressures of about 2000 to 4000 p. s. i. g. in the presence of a cobalt catalyst, aldehydes have been obtained in good yields containing one more carbon atom than the olefin feed, and these aldehydes are readily reducible to the corresponding alcohol or oxidizable to the corresponding acid.

Found suitable for the reaction have been many types of olefins and carbon compounds containing olefinic linkages as well as other groupings. Thus, olefins, olefinic alcohols, esters, olefinic polymers, terpenes, and the like, have all been found suitable as starting material for the aldehyde synthesis product.

In marked contrast to the suitability of the monoolefins for this process, the diolefins are reported to be unsuitable for oxonation. It is apparent that bi-functional compounds such as glycols, dibasic acids, olefinic alcohols, and the like, as well as their derivatives, are of great potential industrial value in a wide variety of applications. These materials are useful as intermediates for synthetic fibers, paints of the alkyd resin type, plasticizers, lube oil additives, and the like. These bi-functional compounds have hitherto, save for adipic and phthalic acid and their derivatives, not been generally industrially available, especially in the medium and higher molecular weight ranges. Due to the increasingly higher costs with increasing molecular weight, only the first few members of each homologous series of bi-functional compounds have found application in industry. It was expected that the Oxo process when applied to diolefins would yield dialdehydes and glycols in satisfactory yields, but hitherto, the art has not shown this possible. Thus, when it is attempted to carbonylate conjugated dienes, such as isoprene, butadiene, cyclopentadiene, and the like, under conditions successful with olefins, there has been obtained polymeric material, saturated mono-aldehydes, and resins. Oxonation of non-conjugated dienes produced only minor amounts, if any, of a dialdehyde and glycol; for the most part, a saturated mono-aldehyde resulting apparently from oxonation of one olefinic double bond and hydrogenation of the second olefinic linkage resulted.

This invention has as an object, a process for preparing good yields of bi-functional compounds from diolefinic compounds by means of the aldehyde synthesis, or Oxo, reaction.

A further object of the present invention is to prepare glycols and unsaturated mono-alcohols in good yields from diolefins by means of the Oxo reaction.

A still further object is the preparation of a plasticizer intermediate of exceptional properties in terms of low temperature characteristics and plasticizer efficiency of the ester.

Other and further objects and results will appear hereinafter.

It has now been found that under certain critical operating techniques disclosed more fully hereinafter, cyclic diolefins, particularly non-conjugated cyclic diolefins may be converted into glycols in high yields when reacted with CO and $H_2$ in the presence of a carbonylation catalyst. In particular, cyclic compounds having one olefinic linkage in the ring and one olefinic linkage either in a side chain or in another ring, are adaptable to the process. Thus, it has been found, for example, that 1-vinyl-cyclohexene-3 reacts, in the presence of a solvent, with carbon monoxide and hydrogen to give high yields of glycol containing ten carbon atoms, accompanied to a certain extent by formation of nonyl alcohols, but substantially unaccompanied by polymerization and resinification by-products hitherto reported as accompanying and as being the main product in the oxonation of diolefins. Similarly, dicyclopentadiene, which hitherto has resisted all attempts at oxonation, has now been converted in good yields to a glycol.

As will be made more clear hereinafter, in particular the nature of the solvent and the ratio of the solvent to the reactant, determine the nature of the final product. With the class of diolefins of the invention, there is a critical diluent-reactant ratio, below which no glycol is obtained.

The present invention will best be understood from the more detailed description hereinafter wherein reference will be made to the accompanying drawing which is a schematic illustration of a system suitable for carrying out a preferred embodiment of the invention. In the drawing and illustration, a more detailed practice of the invention for the preparation of glycols from specific diolefins and wherein operative features required for obtaining high yields of glycols are illustrated. For the purpose of illustration 1-vinyl-hexene-3 is employed as the diolefin feed. It will be understood that other non-conjugated diolefins having one olefinic linkage in the ring and a second olefinic linkage on a side chain or in another ring may be employed. Such compounds may also contain other substituent groups such as oxygen, halogen, sulfur, nitrogen, etc., and may have other functional groups.

Referring now to Figure I, the diolefin or doubly unsaturated compound is pumped through feed line 4 to the bottom portion of primary reactor 2. The latter comprises a reaction vessel which may, if desired, be packed with non-catalytic material such as Raschig rings, porcelain chips, pumice, and the like, and also, it may be divided into discrete packed zones or it may comprise but a single packed zone or even, if desired, may contain no packing. Concurrently through line 3 there is injected into reactor 2, a solvent adapted to dilute the diolefin. The solvent may be a hydrocarbon such as hexane or heptane which is readily separable from the final product. As will be detailed hereinafter, not only the presence of the solvent, but its nature, has a significant effect upon the course of the reaction and upon the products obtained. The proportion of solvent to diolefins may be in the range of 1/2 to 5/1, preferred is 2/1 to 5/1, depending upon the type of the products desired.

The diolefin feed may contain dissolved therein, 1 to 3% by weight on the diolefin of cobalt naphthenate, stearate, or other high molecular weight cobalt soap. Other compounds of cobalt or iron, however, may also be used. A gas mixture comprising $H_2$ and CO in the approximate ratio of 0.5 to 2 volumes of $H_2$ per volume of CO is supplied through line 6 to primary reactor 2 and flows concurrently through reactor 2 with the liquid feed. Reactor 2 is preferably operated at pressures of about 2000 to 4000 p. s. i. g. and at a temperature of about 225° to 375° F. An important element of the present process is the residence time of the reactants within reactor 2. Relatively short contact time favors production of unsaturated $C_9$ mono-aldehydes and alcohols, whereas longer residence time favors production of $C_{10}$ glycols. The residence time, therefore, is adjusted in accordance with the product desired. For the preparation of glycols, the rate of flow of synthesis gas with diolefins and solvent through reactor 2 is so regulated that a diolefin residence time of about ½ to 10 hours on a once-through basis is obtained. Total feed throughput rates of from 0.1 to 2 volumes of feed per volume of reactor per hour are employed.

Liquid oxygenated reaction products containing some catalyst in solution, in part as the metal carbonyl, and unreacted synthesis gases are withdrawn overhead from an upper portion of high pressure reactor 2 and are transferred through line 8 to cooler 10 in which any conventional means of cooling is employed and from there, via line 12 to high pressure separator 14 where unreacted gases are withdrawn overhead through line 16, scrubbed in scrubber 18 free of entrained liquid and cobalt carbonyl and preferably recycled to reactor 2 via line 20.

A stream of primary reaction products containing dissolved therein relatively high concentrations of cobalt carbonyl is withdrawn from separator 14 through line 22. A portion of the withdrawn stream may be recycled to reactor 2 via line 24 to improve glycol selectivity and to aid in temperature control of the primary carbonylation stage. Furthermore, recycling of the primary reaction stage product returns a portion thereof for further contact with catalyst under reaction conditions and thus increases the effective residence time. When the unit is operated to high glycol selectivity with a hydrocarbon diluent, the liquid in the separator will consist of two phases: (1) an upper phase of diluent, unreacted diolefin and mono-oxygenated diolefin, and (2) a lower phase of primarily di-oxygenated diolefin. In this event, the upper phase only would be recycled and the lower phase would be withdrawn as the product. This is shown more clearly in Figure II below.

The balance of the primary reaction product may be withdrawn through pressure release valve 26 and through line 28. The withdrawn liquid may comprise unreacted diolefins in solution and secondary reaction products as well as aldehydes and dissolved cobalt carbonyl. It is passed to catalyst removal zone 30 wherein by suitable heat treatment at about 200° to 400° F., the dissolved catalyst is decomposed. As aid to such decomposition, a stream of an inert gas such as hydrogen or a stream of steam may be admitted to zone 30 through line 32 to aid in stripping or decomposing and removing the evolved carbon monoxide resulting from the decomposition of the metal carbonyl. An exit gas stream comprising the purge gas and carbon monoxide may be removed from zone 30 through line 34 and used in any manner desired.

Liquid oxygenated products and solvent now substantially free of carbonylation catalyst are withdrawn from zone 30 through line 36 and passed to hydrogenator 38. Simultaneously, hydrogen is supplied to reactor 38 through line 39 in proportions sufficient to convert the organic carbonyl compounds in the oxygenated feed into alcohols. Though hydrogenator 38 may contain a mass of any conventional hydrogenation catalyst, highest efficiencies are realized when employing a mass of hydrogenation catalyst comprising 10% molybdenum sulfide supported on an activated carbon carrier. Hydrogenator 38 may be operated at pressures of from about 2500 to 4000 pounds at a temperature of from 300° to 600° F. Preferably, however, reactor 38 is operated at temperatures of 400° to 500° F., and pressures of about 2000 to 3500 p. s. i. g. It is understood, of course, that hydrogenation catalysts such as nickel, copper chromite and other conventional hydrogenation catalysts may be employed. Water also may be injected into the hydrogenation zone to aid in the selectivity to the desired product. The products from the hydrogenation reactor may be withdrawn overhead through line 40, then passed through cooler 42 into high pressure separator 44 where unreacted hydrogen may be withdrawn overhead through line 46 for further use in the system as desired. Liquid products are withdrawn from liquid-gas separator 44 through line 48 and passed to solvent recovery still 50 wherein solvent and low-boiling products, mostly hydrocarbons boiling below about 266° F. are distilled overhead. Solvent thus recovered may, if desired, without further processing, be re-employed in the reaction.

The bottoms from this primary distillation zone are withdrawn from still 50 and sent through line 54 to alcohol still 56. Within 56, separation is made by fractionation between the $C_9$ hydrogenated mono-alcohol which is the by-product in the present reaction, and the glycol. Thus, for example, fractionation conditions in still 56 comprise stillpot temperatures of about 230° to 250° F. at 10 mm. Hg pressure. Though, as has been indicated previously, the oxonation of the diene is a step-wise process wherein there is first produced, an unsaturated carbonyl compound and alcohol which, on further reaction, is converted into a di-carbonyl and di-alcohol or glycol, any unsaturated mono-alcohol resulting from incomplete oxonation of the diene is converted in the hydrogenation stage to the saturated alcohol. This saturated mono-alcohol is withdrawn overhead through line 58 and used in any manner desired as, for instance, an intermediate in the manufacture of plasticizers. The reaction conditions may be set to produce large quantities of this alcohol, i. e. by short contact time and particularly by the omission of solvent.

The bottoms from the alcohol distillation stage are withdrawn from still 56 through line 60 and are passed to glycol still 62 wherein glycol is distilled from higher boiling by-products and reaction products. Still 62, for example, may be operated at 350° to 375° F. under a pressure of 10 mm. Hg. Stills 56 and 62 may be operated at pressures other than 10 mm. Hg as used in the foregoing examples. The actual operating pressures used on stills 56 and 62 will be the highest permissible pressures at which thermal degradation of the products is at a minimum.

An alternate system of operation, and preferred when selectivity to the di-aldehyde is high, is shown in Fig. II. As will be shown more clearly below, a non-polar-solvent such as hydrocarbons, is considerably more effective than polar solvents such as acetone, alcohol, and the like, for the cyclic diolefins. Though the mono-aldehydes are to a greater or lesser extent soluble in hydrocarbons, the di-aldehydes are only slightly soluble, if at all. This characteristic is taken advantage of, not only in effecting at least a partial separation of the reaction products, but also, in increasing the selectivity to the di-aldehyde product.

In accordance with the embodiment shown in Fig. II, effluent from the decobalter is passed to decanter 70. Within this vessel, phase separation occurs. The upper phase comprises hydrocarbon solvent, such as hexane, any unreacted diolefin or hydrogenated diolefin, and also, mono-oxygenated product. The lower phase consists primarily of the di-oxygenated product.

The lower phase is withdrawn through line 72 and may either be passed directly to the hydrogenation stage or, if it is found to contain appreciable amounts of partially oxonated product, may be passed to a distillation stage 74 wherein partially oxygenated material is withdrawn overhead through line 76, and the di-aldehyde is withdrawn through line 75 and passed to the hydrogenation stage. Zone 74 is preferably operated at reduced pressure and short residence time.

The upper layer is withdrawn from decanter 70 through line 82. A portion of this product is recycled to the primary carbonylation stage via lines 84 and 86 for further conversion of mono-aldehydes to di-aldehydes. This recycle stream may augment the product recycle stream 24 in Fig. I; under certain circumstances, it may be desirable to supplant stream 24 by stream 86.

To prevent too great a build-up of secondary reaction products in the carbonylation stage, the balance of the upper layer withdrawn through line 82 is passed via line 88 to distillation zone 90, wherein a separation is made between mono-aldehydes and solvents on the one hand, and heavier products on the other. The former are withdrawn overhead and recycled through lines 92, 94, and 86, to the aldehyde synthesis stage. Overhead products from distillation zone 74 may be added to the stream also. The heavier products are withdrawn through line 96 and may, if desired, be passed with stream 75 to the hydrogenation stage.

The present invention may be further illustrated by the following specific examples delineating conditions and results when 1-vinyl-hexene-3 is oxonated. The experiments were carried out in autoclaves.

EXAMPLE I

|  | A | B | C |
|---|---|---|---|
| Charge, cc. |  |  |  |
|   Diolefin | 250 | 1,000 | 500. |
|   Hexane |  | 500 | 1,000. |
| Catalyst: |  |  |  |
|   Type | Cobalt Oleate | Cobalt | Cobalt. |
|   Wt. percent cobalt | 4 | 1.2 | 1.2. |
| Reaction Conditions: |  |  |  |
|   Temp., °F | 302 | 302 | 302. |
|   Pressure, p. s. i. g | 4,500 | 3,300 | 3,300. |
|   CO/$H_2$ Ratio | 1/1 | 1/1 | 1/1. |
|   Hrs. on Condition | 2 | 6 | 7. |
| Yield, Wt. Percent |  |  |  |
|   $C_9$ alcohol | 36.7 | 34.0 | 30.5. |
|   $C_{10}$ glycol | 0 | 50.1 | 55.0. |
|   Hydrocarbon Bottoms |  | 15.9 | 14.5. |

These data show clearly the dependence upon solvent and contact time upon the nature and the yields of the reaction products and that both long contact time and the presence of a solvent favor glycol production. Thus, when no hydrocarbon solvent was present, no glycol was obtained, though a $C_9$ alcohol product was obtained in reasonable yield. The presence of a hydrocarbon solvent and of an extended reaction time gave good yields of glycol, as well as of the alcohol.

The glycol product comprises a mixture of isomeric $C_{10}$ diols which may be represented as follows:

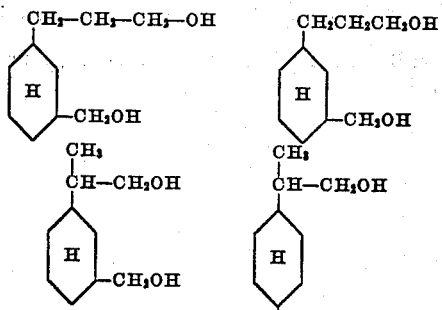

where

is the hexahydrobenzene ring. This glycol product, a new composition of matter, is characterized as follows:

|  | Experimental | Calculated |
|---|---|---|
| Elementary Analysis: |  |  |
|   C (wt. percent) | 70.1 | 69.8 |
|   H (wt. percent) | 11.9 | 11.6 |
|   O (wt. percent difference) | 18.0 | 18.6 |
| Hydroxyl (centiequivalents/gm) | 1.11 | 1.16 |
| Boiling Range: |  |  |
|   °C. at 3.1–3.3 mm | 153.5–156.9 |  |
|   °C. at 760 mm. (estimated) | 305–317 |  |
| Density, g./cc. at 25° C | 1.00 |  |
| Refractive Index, $N_D^{20}$ | 1.4890 |  |

The nonyl alcohol product recovered from the process, a mixture of 3- and 4-ethyl hexahydrobenzyl alcohols, had the following physical properties.

*Inspections on the $C_9$ alcohol from vinyl cyclohexene $C_9H_{18}O$*

| Molecular weight | 144 |
|---|---|
| Boiling range, °C | [1] 216–218 |
| Density @ 20° C | 0.91–0.92 |
| $n_D^{20}$ | 1.4672 |

[1] Corrected to 760 mm. Hg.

By a process similar to that employed in the conversion of vinyl cyclohexene to mono and di-aldehydes, alcohols and glycols, dicyclopentadiene was converted to the corresponding $C_{11}$ alcohol and glycol. This diolefin has been particularly resistant to oxonation, and prior attempts to prepare glycols therefrom have almost always resulted in the formation of a resin polymer. But when operating in accordance with the present invention, by employing the critical ratios of diluent to reactants as well as the other conditions of operation, good yields both of the $C_{11}$ alcohol and the $C_{12}$ glycol were obtained, as shown in the following examples.

*Oxonation of dicyclopentadiene in hexane*

|  | A | B | C | D |
|---|---|---|---|---|
| Diluent/Dicyclopentadiene Ratio (V./V.) | 2.3/1 | 2/1 | 3/1 | 4/1 |
| Oxonation: |  |  |  |  |
|   Temp., °C | 160 | 150 | 150–175 | 150–165 |
|   Press, p. s. i. g | 3,500 | 3,500 | 3,500 | 3,500 |
|   Time under specified conditions, hours | 1½ | 1½ | 2¼ | 3 |
|   Induction period, min | 0 | 0 | 0 | 11 |
| Conversion, mole percent | 50.0 | 62.9 | 84.7 | 91 |
| Yield, mole percent: |  |  |  |  |
|   $C_{11}OH$ | 45.5 | 61.2 | 21.5 | 18.4 |
|   $C_{12}(OH)_2$ | 0 | 0 | 56.7 | 57.6 |
|   Bottoms | 4.5 | 1.7 | 6.5 | 15.2 |
| Selectivity, mole percent: |  |  |  |  |
|   $C_{11}OH$ | 91.0 | 97.5 | 25.4 | 20.2 |
|   $C_{12}(OH)_2$ | 0 | 0 | 67.0 | 63.1 |
|   Bottoms | 9.0 | 2.5 | 7.6 | 16.7 |

These data clearly demonstrate the critical effect of hydrocarbon solvent ratio upon the formation and yield of the glycol. Below 3/1 diluent/reactant ratio, the product was found to consist almost entirely of $C_{11}$ alcohol. At higher diluent ratios, the selectivity to glycol increases.

Of particular interest is the effect of the nature of the diluent upon the reaction products. In the case of oxonation of dicyclopentadiene, it was found that a polar solvent, such as acetone, even at high dilution of 3/1, failed to yield any glycol; only the $C_{11}$ alcohol product was formed. In the case of the vinyl cyclohexene, it was found that the glycol/alcohol selectivity ratio was much lower with polar solvents than with non-polar solvents and diluents, as follows:

| Diluent | Diluent/ diolefin | Glycol/ alcohol Ratio |
|---|---|---|
| Hexane | 3/1 | 2/1 |
| Ethanol | 3/1 | 1/1 |
| Dioxane | 3/1 | 0.6/1 |

From this it appears that the ratio and type of solvent employed is dictated by the nature of the desired product.

The $C_{11}$ alcohol and the $C_{12}$ glycol product resulting from the oxonation of dicyclopentadiene were found to have the following properties.

|  | $C_{11}H_{18}O$ | $C_{12}H_{20}O_2$ |
|---|---|---|
| Boiling Point, ° F. (corrected to 760 mm.) | 464 | 626–698 |
| Density @ 20° C | 1.0 | 1.07 |
| Molecular Weight | 166 | 196 |
| Refractive Index, $D_{20}°$ | 1.5133 | 1.5204 |
| Hydroxyl (centiequivalents/gm.) | 0.602 | 1.020 |

The plasticizing properties of the new alcohols and glycols of the invention were investigated and found to be outstanding. Thus, the decyl glycol and the nonyl alcohol product resulting from the oxonation of 1-vinyl hexene were converted to esters, and the esters evaluated as plasticizing agents; in these tests the esters were compared with three widely used plasticizers, namely, di-2-ethyl hexyl phthalate, di-n-octyl phthalate, and di-iso-octyl phthalate. For the purposes of the test, the nonyl alcohol was esterified with phthalic acid and the glycol with caprylic acid (i. e. a monobasic acid). The products of the present invention have been found to constitute superior plasticizers for polyvinyl resins such as polyvinyl chloride.

This superiority is reflected in the $C_{10}$ glycol ester in terms of a desirably low modulus of the plasticized composition, plasticizing efficiency, aging and heat stability, and by low temperature properties. Esterification of the glycol with other acids such as hexoic, iso-heptoic, octoic and the like may be expected to give similar and even superior results.

The phthalate of the $C_9$ alcohol, ethylhexahydrobenzyl alcohol also shows superior properties, particularly in terms of light transmission and its retention of properties on oven aging. It shows markedly better plasticizer retention in both the volatility and extraction tests than either di-normal-phthalate or diethylhexylphthalate.

The ester plasticizer and their preparation form the subject matter of a separate application, Serial No. 389,686, filed on November 2, 1953.

While the foregoing description and exemplary operations have served to illustrate specific applications and results, the invention is not limited thereto. Other modifications may appear to those skilled in the art. Thus, instead of employing the non-conjugated diolefinic hydrocarbon wherein one olefinic linkage is in a ring, suitable derivatives of such class of compounds may also be employed containing halogen, oxygen, nitrogen, sulfur and the like, as well as functional groups such as alkoxy, aryloxy, hydroxy, carbonyl, etc.

What is claimed is:

1. A process for the preparation of glycols from substituted alicyclic compounds having two non-conjugated olefinic linkages one of which linkages is in a ring, which comprises reacting said compounds with carbon monoxide, hydrogen and a cobalt carbonylation catalyst in the presence of a hydrocarbon solvent, the ratio of said solvent to said diolefin compound being at least 2/1, maintaining said reaction mixture at elevated temperatures of from about 225° to about 375° F. and pressures of from about 2,000 to about 4,000 p. s. i. g. and in contact for a period of time, in the range of about 0.5 to about 10 hours, conducive to form a dialdehyde conversion product, hydrogenating said product and recovering good yields of glycols.

2. The process of claim 1 wherein said ratio of solvent to diolefin feed is at least 3/1.

3. The process of claim 1 wherein said alicyclic compound is 1-vinyl-cyclo-hexene-3.

4. The process of claim 1 wherein said alicyclic compound is dicyclopentadiene.

5. A process for the preparation of glycols from substituted alicyclic compounds having two non-conjugated olefinic linkages one of which linkages is in a ring, which comprises passing said compound, carbon monoxide, hydrogen, a non-polar hydrocarbon solvent and a cobalt carbonylation catalyst to a primary reaction zone, maintaining elevated temperatures of about 225° to about 375° F. and pressures in the range of from about 2,000 to about 4,000 p. s. i. g. in said zone, maintaining a ratio of solvent to diolefin feed of at least 3/1 in said zone, maintaining a residence time of said reactants in the range of 0.5 to 10 hours on a once-through basis, withdrawing from said zone a reaction product comprising mono and di-aldehyde product and dissolved catalyst, separating catalyst from said product, passing said catalyst-free product to a liquid-liquid separation zone, forming an upper layer in said zone comprising solvent and mono-aldehyde product, forming a lower layer in said zone comprising di-aldehyde product, recycling at least a portion of said mono-aldehyde product to said initial reaction zone for further conversion to di-aldehyde product, passing said lower layer to a hydrogenation zone, converting said di-aldehyde product to a glycol and recovering high yields of glycols.

References Cited in the file of this patent

UNITED STATES PATENTS

| 2,462,448 | Whitman | Feb. 22, 1949 |
| 2,504,682 | Harlan | Apr. 18, 1950 |
| 2,530,989 | Parker | Nov. 21, 1950 |
| 2,545,811 | Hetzel | Mar. 20, 1951 |
| 2,549,454 | Gresham et al. | Apr. 17, 1951 |
| 2,549,455 | Gresham et al. | Apr. 17, 1951 |
| 2,553,996 | Abbott | May 22, 1951 |
| 2,556,150 | Wearn et al. | June 5, 1951 |
| 2,610,201 | Rutherford | Sept. 9, 1952 |

FOREIGN PATENTS

| 493,493 | Belgium | Feb. 15, 1950 |
| 665,705 | Great Britain | Jan. 30, 1952 |

OTHER REFERENCES

Ovakimian et al.: Chem. Abstracts, vol. 32, page 484 (1938).

Wender: Bureau of Mines Report R. I. 4270, July 1948, pgs. 4, 5, 20.